Feb. 7, 1933.    C. C. CHAMPION, JR    1,896,163
INTERNAL COMBUSTION ENGINE
Filed March 31, 1927    3 Sheets-Sheet 1
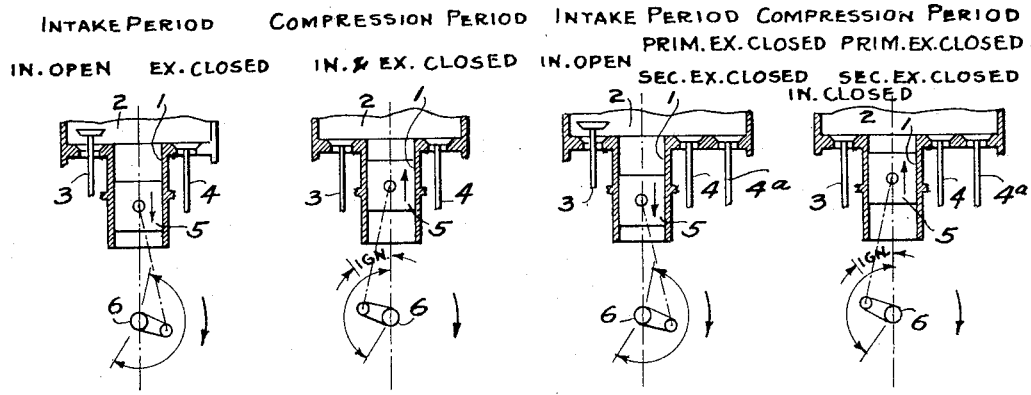
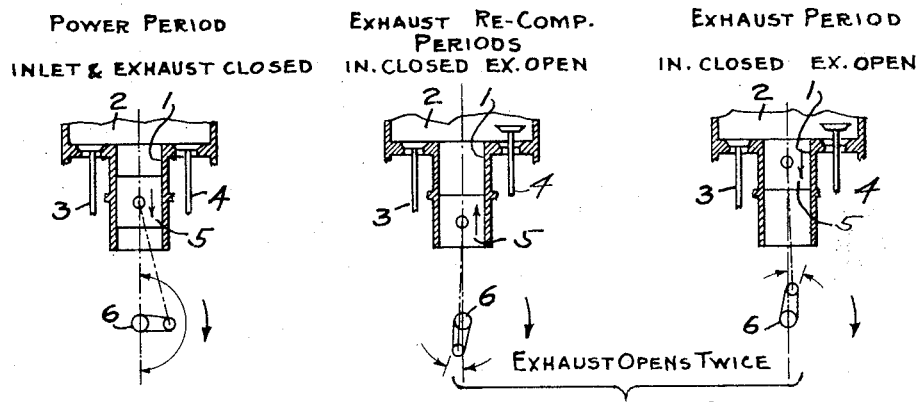
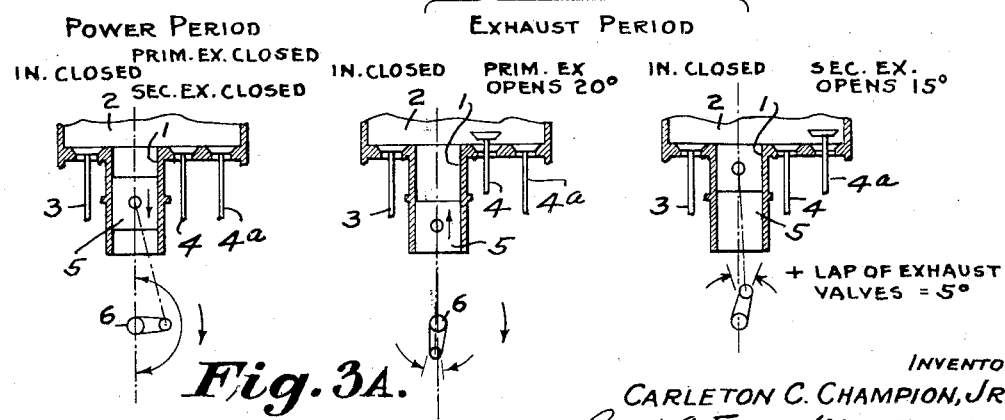
INVENTOR
CARLETON C. CHAMPION, JR.,
BY ATTORNEY Feb. 7, 1933.   C. C. CHAMPION, JR   1,896,163
INTERNAL COMBUSTION ENGINE
Filed March 31, 1927   3 Sheets-Sheet 2
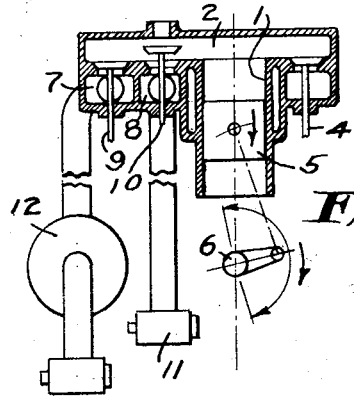
INTAKE PERIOD
SUCTION INLET OPEN
Fig. 5.
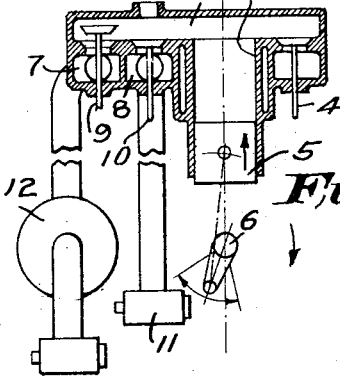
SUPERCHARGE PERIOD
PRESSURE INLET OPEN
Fig. 6.
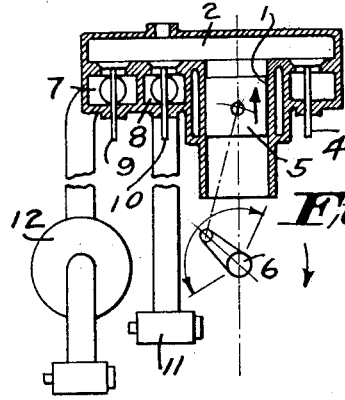
COMPRESSION PERIOD
INLETS & EXHAUST CLOSED
Fig. 7.
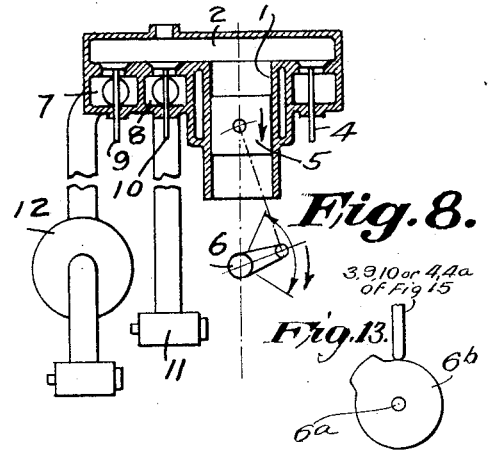
POWER PERIOD
INLETS & EXHAUST CLOSED
Fig. 8.
Fig. 13.
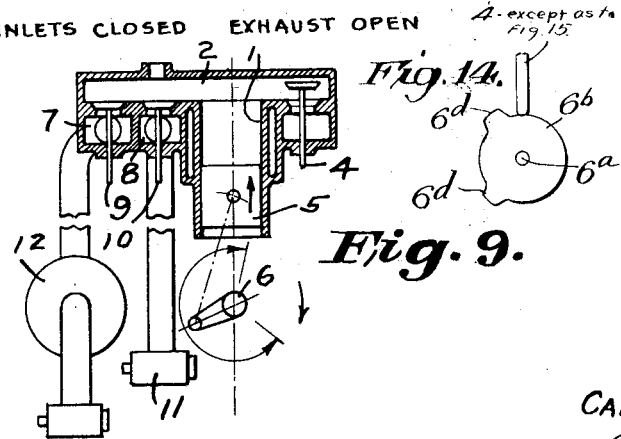
EXHAUST PERIOD
INLETS CLOSED   EXHAUST OPEN
Fig. 9.
Fig. 14.
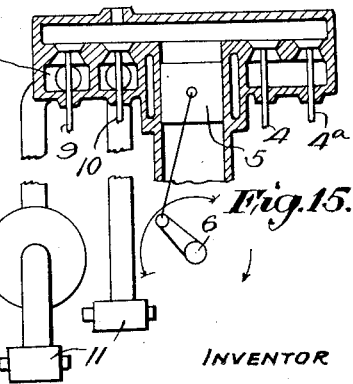
Fig. 15.
INVENTOR
CARLETON C. CHAMPION, JR.,
BY              ATTORNEY Feb. 7, 1933.   C. C. CHAMPION, JR   1,896,163
INTERNAL COMBUSTION ENGINE
Filed March 31, 1927   3 Sheets-Sheet 3

INVENTOR
CARLETON C. CHAMPION, JR.,
BY
ATTORNEY

Patented Feb. 7, 1933

1,896,163

UNITED STATES PATENT OFFICE

CARLETON COLE CHAMPION, JR., OF WASHINGTON, DISTRICT OF COLUMBIA

INTERNAL COMBUSTION ENGINE

Application filed March 31, 1927. Serial No. 179,923.

(GRANTED UNDER THE ACT OF MARCH 3, 1883, AS AMENDED APRIL 30, 1928; 370 O. G. 757)

In one primary sense may invention consists in providing a new period method of operating internal combustion motors, and in several of the steps thereof, and each of which may be readily attained in practice by slight, or without substantial, changes in each of the many common forms of existing apparatus which those skilled in the art may readily adapt and employ after becoming familiar with my method, and each of its steps, and of my deliberations and discoveries contributing to my invention as a whole, and to each of its component steps.

The more potent of my said deliberations and discoveries are as follows:

In the reciprocating piston type of internal combustion motors, the greatest stress upon each connecting rod of such motor is a compression strain during the power period, with the opposed stress (a tension strain occurring upon each such rod during the intake period while the exhaust cycle occurs between said power and intake periods.

In the modern high speed motors of said type, before my invention, such stress reversals, from high to no compression and from none to maximum tension, were of substantially instantaneous occurrence and recurrence, and resulted in great fatigue of the metal forming each such rod, which required a higher factor of safety with accompanying greater strength and weight of metal in each such rod. Said sudden stress reversals, occurring and recurring with high rhythmic frequency, were transmitted to the crank shaft and piston bearings causing greater wear and "knock" thereof, and substantial destructive vibrations of the whole motor, and vehicle driven thereby, thereby causing a greater deterioration through crystallization and otherwise, of each of the parts thereof, and greatly impaired the riding comfort of said vehicle. To overcome the effect of said motor vibrations upon the said riding comfort, rotative synchronizing unbalanced weight has been employed, before my invention, but said vibrations remained destructively inherent in the motor and its component and associated parts.

In a supercharged motor, at atmospheric, as well as at lesser, pressure the motor intakes a greater combustion charge than it otherwise would, and hence it generates greater power, stresses, rapidity and abruptness of transitions between such different stresses, with more intensive resulting motor vibrations, as well as heat within each cylinder and upon the valves thereof.

It is the suddenness of the transitions between opposite stresses, recurring with high rhythmic frequency, that causes destructive motor vibrations; and therefore, as one step in my invention, I have discovered that if, in each exhaust period, occurring between the power and intake periods, the transition from the maximum compression stress in each connecting rod, during each intake period, be attained with less suddenness, and more gradually, or be a progressively stepped transition, thereby such destructive motor vibrations are obviated at their source and result in a more vibrationless longer lifed motor and motor parts, and greater riding comfort is attained in a vehicle driven thereby without necessitating the rotative synchronizing unbalanced weight required to be employed before my invention to extraneously counteract the effect on said riding comfort of the vibrations inherent in such motors before my invention.

By said step of my said method I thereby also produce a motor requiring a lesser factor of safety in each, and hence lighter, connecting rod; as well as having less wear of, and liability for "knock" in, the crank shaft and piston bearings, with less piston slap and resultant wear between the walls of each piston and its cylinder.

I prefer to employ said step of my method of gradually and progressively stepping the transitions between the stresses upon each of the connecting rods especially during each exhaust period because, before my invention, the greatest and most extensive sudden said transition occurred during each exhaust period.

Said step of my method may be readily employed in practice by slight, or without substantial, changes in each of the many common forms of existing apparatus, which may be such as to require greater force to move each piston during its exhaust period, or a substantial portion thereof, either by creating a back-pressure upon each piston in each of the manners and at the time illustrated in the drawings, or by many of the many other means which those skilled in the art may readily adapt and employ after becoming familiar with my method.

With said step of my method practiced by either of the means I have shown in the drawings, by the keeping of the exhaust valve means closed during a substantial portion of each normal exhaust period, during which time before my invention the exhaust valve means was always open, my said prolonged contact of the exhaust valve means with the valve seat or seats also results in a substantially greater heat transfer from said valve means to the valve seat or seats, and thence to the cooling medium or the atmosphere. Said back-pressure upon each piston during a substantial portion of each exhaust period also counteracts, more uniformly throughout the length of the crank shaft, any tendency to upward pull upon the crank shaft and its bearings otherwise caused by the piston or pistons of another cylinder or cylinders forming the motor whose intake period may be simultaneous with the exhaust period of another component cylinder or cylinders of said motor; and vibration and wear are thereby prevented at their said source while before my invention the high rhythmic frequency of said vibrations caused substantial wear of the crankshaft bearings and "knock" therein and contributed substantially to motor vibration.

This is said step of my method materially and potently functionally correlated to and interdependent upon the intake period of the same and other component cylinders of the motor both in said last named vibration elimination as well as in the aforesaid greater heat transfer from said exhaust valve means to their seats.

A further step in my new cycle for internal combustion motors consists in the creation of a new intake period therefor, consisting of intaking fuel and air throughout the whole of the normal intake period as well as continuously prolonging the same into and throughout a substantial portion of the early part of the heretofore normal compression period. In practice this step of my said method is preferably accomplished by initially intaking at atmospheric pressure throughout the greater portion of the heretofore normal intake period, and then discontinuing said atmospheric intake near the end of the heretofore normal intake period, and before the crank attains its lower or outer dead center; and then intaking a supercharge, of substantially greater pressure than atmospheric, said supercharge commencing simultaneously with the discontinuance of said atmospheric intake and continuing throughout a substantial portion of the initial part of the heretofore normal compression period. This results in a greater than otherwise fuel intake, power, heat and stresses on the motor parts whose sudden reversals would cause more intensive motor vibrations but for my method as a whole, as well as its component steps.

In the initial part of said further step of my invention the initial intake is at a velocity proportionate to the piston speed of the motor which causes, throughout said initial intake, a tension stress upon the connecting rod. The immediately succeeding supercharge occasions a gradual reversal of said stress into a gradual compression strain whose maximum is a factor of the pressure of said supercharge. Said compression strain, from said maximum, is then progressively increased by and throughout the period of the compression of the intaken products. Said gradual transition of said stresses overcomes any tendency to produce vibrations of high rhythmic frequency which would be occasioned but for this step of my invention.

Said further step of my invention also enables a supercharger of substantially less weight, capacity and required motive power to be employed, since by my new intake period, each supercharge is received only during a very small terminal portion of the intake period of each cylinder composing the motor, the supercharger working continuously, and during the intervals in which it is not supercharging any cylinder said supercharger is storing its compressed charge in the relatively large interior volume of the manifold 7 and its connection with supercharger 12, said volume of said members thus functioning as an accumulator.

Each atmospheric intake is at high velocity and occupies but an infinitesimal fraction of time in modern high speed internal combustion motors, and, upon the closing of its valve, the kinetic energy of said high velocity intake results in the formation of a partial vacuum adjacent said valve due to a greater density of said intake charge then existing near the piston and produced by said kinetic energy; and by the step of my invention consisting of commencing to admit the supercharge simultaneously with the closing of said atmospheric intake valve, I take advantage of said partial vacuum whereby the supercharger, and its accumulator, is working against this substantially reduced back-pressure of this adjacent portion of said atmospheric charge and therefore requires less energy being expended for full supercharging during the materially lesser than atmospheric intake fraction of time allotted for my new supercharging in the modern high speed internal combustion motor, during which said lesser time interval for supercharging said partial vacuum would continue but for my invention.

My said further step of my invention takes further advantage of said partial vacuum in that each such atmospheric charge is by said kinetic energy rendered denser at or near the piston and progressively less dense nearer its intake valve, my supercharge then introduced into the cylinder against the rarified end of said atmospheric charge greatly facilitates the intimate mixture of said atmospheric and supercharge components of each intake charge, creates a greater turbulence in the mass of each of the successive intake charges of each of my new intake periods and a finer atomized more intimately mixed combustible mixture of greater weight and pressure in the mass of the successive intake charges each of different characteristics.

The initial intake being at atmospheric pressure of the appropriate mixture of fuel and air, the resulting vaporization of said fuel materially lowers the temperature of said initial intake charge which, before my invention, occasioned fuel condensation within its manifold and cylinder and caused fuel waste and crank case dilution with substantial bearing hazard; but said further step of my invention also directly obviates said critical conditions due to the substantially greater pressure of the subsequent supercharge materially raising the temperature of such supercharge, which is superimposed upon the rarified end of said initial intake charge, which thereby further causes a more sudden and complete substantial heat intercharge between each such successive intake of different characteristics of each of my new intake periods.

Further objects of my invention will appear more fully hereinafter as the description of the method and apparatus is developed.

My invention consists substantially in the hereinbefore described method, and each new step thereof, as well as more specifically in the construction, combination and arrangement of parts of the apparatus by means of which my method may be practiced all as will be more fully hereinafter set forth and as shown by the accompanying drawings and finally pointed out in the appended claims.

Reference is to be had to the accompanying drawings forming a part of this specification in which like reference characters indicate corresponding parts throughout the several views and in which:—

Figures 1 to 4 diagrammatically represent portions of an internal combustion engine of standard type in which have been incorporated the embodiments of my invention and illustrate the various periods of one cycle of operation of the engine.

Figures 1a to 4a diagrammatically represent corresponding portions of my internal combustion engine having a plurality of valves and in which I have incorporated the various features of my invention and illustrate various periods of one cycle of the operation of the engine.

Figures 5 to 9 diagrammatically represent the various periods of one cycle during the operation of the engine shown in Figures 1a—4a in conjunction with my improved supercharging apparatus.

Figure 10 diagrammatically shows one complete cycle of operation of the engine shown in Figures 1 to 4.

Figure 11 diagrammatically shows one complete cycle of operation of the engine shown in Figures 1a to 4a.

Figure 12 diagrammatically shows one complete cycle of operation at high speed of the engine and supercharging apparatus shown in Figures 5 to 9 with the exhaust period comprising substantially 250 degrees during the initial 80 degrees of which I prefer to have the primary exhaust, the secondary exhaust taking place during the terminal substantially 40 degrees and recompression during the intervening substantially 130 degrees.

Figure 13 illustrates a conventional means for operating the valve stems;

Figure 14 illustrates a conventional means for operating the exhaust valve stem referred to in the first paragraph following the description of the various figures of the drawing; and Figure 15 is a diagrammatic view of an engine employing the primary and secondary inlet as well as exhaust valves.

Figure 10:
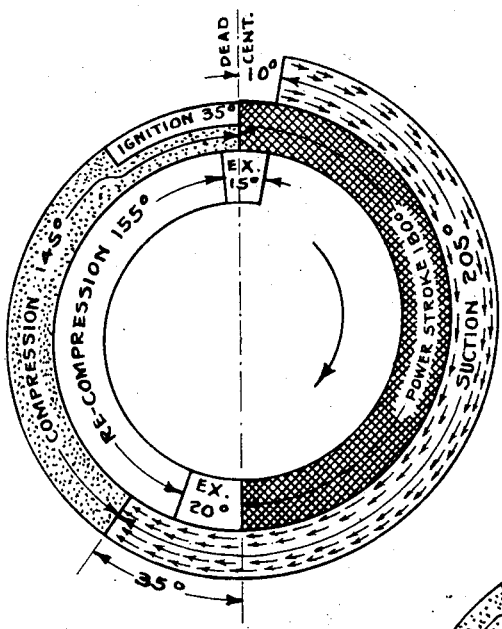
Figure 11:
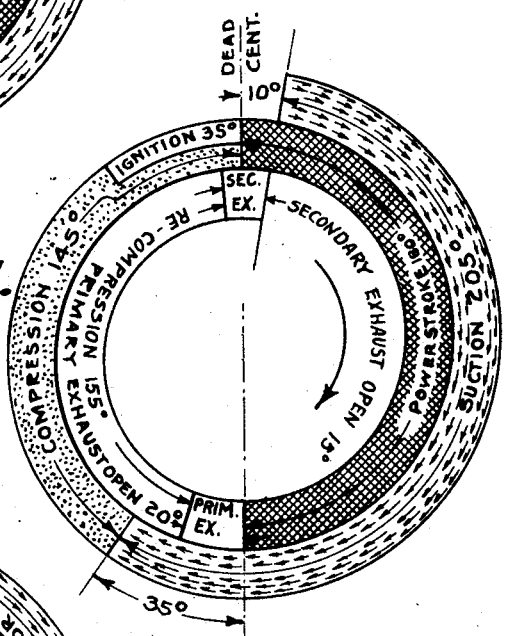

Referring to Figures 1 to 4, 1 represents one cylinder of a multiple four-cycle internal combustion engine, having a combustion chamber 2, inlet valve 3, and exhaust valve 4. The combustion chamber is of the conventional type and forms a space within which fuel mixture is compressed and burned and permitted to impart its energy to the piston 5 in the usual manner. In this type of engine the intake period, the compression period and the power period are substantially the same as in any standard modern engine. The exhaust period, however, is modified in the following manner. The exhaust valve 4 is opened for a short interval at the beginning of the exhaust period, is then closed causing a recompression of the exhaust gases within the combustion chamber and is then opened near the end of the exhaust period, as shown in Figure 4. The operation of the exhaust valve 4 is accomplished by the substitution of an exhaust cam having a plurality of maxima in the place of the usual exhaust cam upon the standard cam shaft of the internal combustion engine.

Referring to Figures 1a—4a, 1 represents one cylinder of a multiple four-cycle internal combustion engine, having a combustion chamber 2, an inlet valve 3, and a plurality of exhaust valves 4 and 4a. The combustion chamber is of the conventional type and forms a space within which the ignited fuel mixture is compressed and burned and permitted to impart its energy to the piston 5 in the usual manner. The intake period, the compression period and the power periods are substantially the same as in any standard modern engine. The operation of the plurality of exhaust valves, however, has been changed in the following particulars: The primary exhaust valve 4 is opened for a period of approximately 20 degrees of rotation of the crankshaft 6 and is then closed. The primary exhaust valve 4 and the secondary exhaust valve 4a remain closed through the next approximately 155 degrees of the rotation of the crankshaft 6. During this period the burned exhaust gases within the cylinder are compressed. The secondary exhaust valve 4a then opens and allows the remainder of the exhaust gases to be expelled rapidly through its port during the last 15 degrees of travel of the crank shaft 6 through the exhaust period.

By this arrangement in the type of engine shown in Figures 1a to 4a I have also improved the thermal conditions within the combustion space by reducing the mean temperature of the exhaust valves for any condition of operation by allowing the transfer of heat from the valve to the cylinder block and by preventing their being heated by conduction by the passage of the exhaust gases therearound by keeping them closed during a portion of the exhaust period and maintaining their temperature near the mean.

In both types of engines as shown in Figures 1 to 4 and 1a to 4a I have practically eliminated the undesirable high temperatures prevailing in the exhaust valves of modern engines and have also eliminated the primary factor causing preignition, detonation, valve warping, pitting and scoring of the valves and the secondary effects such as spark-plug trouble, lubrication difficulties, and the carbonization of the fuel and lubricating oil within the combustion chamber around the exhaust valves.

Further, in both types of engine illustrated I have by my method as a whole and each of its steps attained each of the several substantial accomplishments herein before stated.

Referring to Figures 5 to 9 in which I have shown a preferred form of the intake method that may be applied to either of the engines described with reference to Figures 1 to 4 and 1a to 4a, and to any other motor, and in which 7 and 8 refer to dual separated intake manifolds, that are closed by valves 9 and 10. The number of valves may be increased to any number desired for each manifold. Manifold 8 is connected in the usual manner to the supply port, under atmospheric pressure of a carburetor 11. Manifold 7 is supplied with fuel under pressure from a supercharging mechanism 12 of any conventional construction.

The valves are operated in any conventional manner such, for example, as cams. I have arranged the operation of the intake period of this modification as follows. At the beginning of the intake period, the valve 10 is opened. The cylinder then obtains its charge of fuel under atmospheric pressure from the carburetor 11 in the customary manner. During the greater portion of the intake period the valve 10 remains open. Near the end of the normal intake stroke of the piston the valve 10 closes and the valve 9 opens allowing the fuel under pressure to be introduced into the cylinder by the supercharging mechanism 12. In this manner I have eliminated the rarefaction and recompression of the charge as introduced by the usual supercharger operating at the beginning of and throughout the whole of the intake period as is customary in internal combustion engines in present use, and have thereby attained each of the other manifest substantial advantages and chemical reactions with their respective methods and means for their attainment, heretofore stated.

The remainder of the cycle follows the operation described with reference to Figures 1 to 4 and 1a to 4a. For the particular ratios of the various periods in the engines described in Figures 1 to 4, and 1a to 4a, reference is to be had to the operation diagrams 10, 11, referring to each of the groups of figures respectively, all of which may be embodied in the same motor at the will of one skilled in the art after becoming familiar with my invention.

Figure 12:
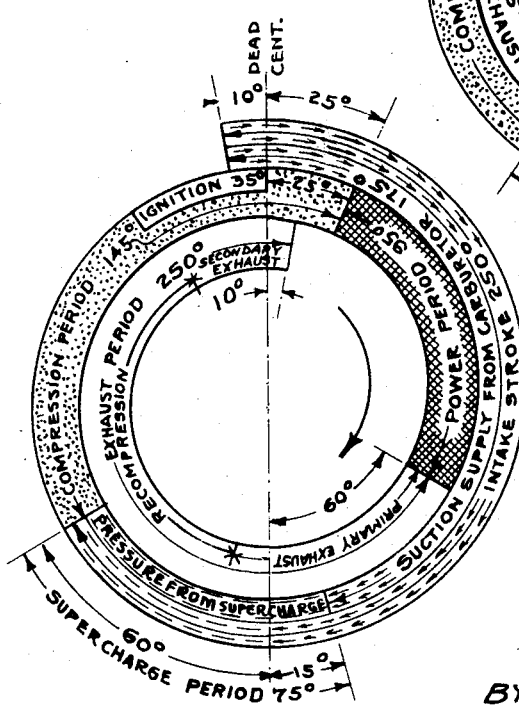

Figure 12 is the diagram preferably of all of my said invention when embodied in a high speed motor, wherein the power period practically terminates substantially at 120 degrees of the movement during the power period, whereupon the exhaust opens. When my primary and secondary exhaust means are employed, as I prefer to employ them herein, the primary exhaust valve opens, and remains open at least until the crank reaches its dead center, or to 10 degrees beyond the dead center, thence both primary and secondary exhaust valves are, and remain, closed throughout the interval of about 130 degrees of the central portion of the heretofore normal exhaust period whereupon the secondary exhaust valve opens and remains open, until the crank reaches its dead center and to substantially 10 degrees beyond. About 10 degrees in advance of dead center the primary intake valve commences to open and to intake its charge at atmospheric pressure until it closes at substantially 15 degrees short of dead center which is substantially the normal terminus of the intake period; whereupon the secondary intake valve opens and admits the supercharge and remains open and continues to receive said supercharge during the remaining 15 degrees of the normal intake period and during the initial about 60 degrees of the heretofore normal compression period, whereupon said secondary intake valve closes and remains closed until the corresponding point in the succeeding intake period.

The ignition commencing, in the instance shown in Figure 12, 35 degrees in advance of the high dead center, the high speed of the motor affords such an infinitesimal fraction of elapsed time between such event and the attainment of such rapidity and volume of flame propagation within the sealed combustion space as to attain pressure worthy of being denoted the commencement of the power period. It is therefore difficult to practically ascertain the definite point at which such power period commences, but in Figure 12, it has been unimportantly assumed that said power period commences about 25 degrees after passing the high dead center.

The 20 degrees of overlap between the closing of the auxiliary exhaust valve and the commencing of the initial intake valve to open, affords practically no fouling of the intake charge as the recompression of the unexhausted products enables their more rapid and complete exhaustion upon the opening of the auxiliary exhaust valve. Supercharged motors consume more fuel economically and therefore require greater facilities for cooling the exhaust valves. Their greater power output sets up greater motor vibrations which require nicer planned, more refined and efficient method and means to counteract and prevent such vibration tendencies at their source.

The cam shaft or shafts 62, Figures 13 and 14, is operated in the usual manner and has a cam 6b thereon for each valve stem 3, 9 and 10, and 4, 4a of Figure 15. The cam 6b, Figure 13, is provided with one raise 6c thereon, being the conventional means, for operating said valve stems. The cam 6b of Figure 14 is provided with two raises 6d thereon for operating the exhaust valve stems 4 of each cylinder shown in Figures 1 to 4 inclusive as heretofore stated.

Figure 15 merely combines the disclosures of Figures 3a and 7 with the result of two intake and two exhaust valves functioning as heretofore stated.

It will be understood that the above description and accompanying drawings comprehend only the general and preferred embodiment of my invention and that minor detail changes in the construction and arrangement of parts may be made within the scope of the appended claims without sacrificing any of the advantages of my invention.

Those skilled in the art will understand from the drawings and disclosure that both primary and secondary intake and exhaust means or valves are designed and intended to be employed upon one and the same engine when so desired and that the most advantageous employment of my invention contemplates and includes their said employment in and as part of one and the same engine.

The invention herein described may be manufactured and used by or for the Government of the United States for governmental purposes without the payment to me of any royalty thereon or therefor.

Having thus described my invention what I claim is:—

1. In the operation of an internal combustion motor the method of exhausting burned gases from a four-cycle combustion engine having a combustion chamber, and primary and secondary exhaust valves, which includes as a step opening the primary exhaust valve for a period within the total exhaust period, closing the primary exhaust valve, recompressing the burned gases remaining within the combustion chamber after the closing of the primary exhaust valve, and opening the secondary exhaust valve for the expulsion of the recompressed burned gases.

2. In the operation of an internal combustion motor the method of exhausting burned gases from a combustion engine having a combustion chamber, and primary and secondary exhaust valves, which includes as a step opening the primary exhaust valve for a period of a substantial number of degrees at the beginning of the total exhaust period, closing the primary exhaust valve, recompressing the burned gases remaining in the combustion chamber after the closing of the primary exhaust valve, and opening the secondary exhaust valve for the expulsion of the recompressed burned gases.

3. In the operation of an internal combustion motor the method of exhausting burned gases from a four-cycle combustion engine having combustion chambers, and primary and secondary exhaust valves, which includes as a step opening the primary exhaust valve for a period of a substantial number of degrees at the beginning of the total exhaust period, closing the primary exhaust valve, recompressing the burned gases remaining in the combustion chamber after the closing of the primary exhaust valve, and opening the secondary exhaust valve for approximately the last fifteen degrees of the total exhaust period for the expulsion of the recompressed burned gases.

4. The method of operation of internal combustion engines, having combustion chambers, primary and secondary intake valves, a carburetor connected to the primary intake valve, and a supercharger connected to the secondary intake valve, which consists in opening the primary intake valve for a portion of the intake period, closing the primary intake valve and opening the secondary intake valve for the remainder of the intake period, closing the secondary intake valve at the end of the intake period, compressing and igniting the fuel charge, exhausting the burned gases for a period within the total exhaust period, recompressing the burned gases remaining in the combustion chamber after the first period of exhaust, and exhausting the recompressed burned gases.

5. The method of operation of combustion engines, having combustion chambers primary and secondary intake valves operating on the four stroke cycle, a carburetor connected to the primary intake valve, and a supercharger connected to the secondary intake valve, which consists in opening the primary intake valve for a portion of the intake period, closing the primary intake valve and opening the secondary intake valve for the remainder of the intake period, closing the secondary intake valve at the end of the intake period, compressing and igniting the fuel charge; exhausting the burned gases for a period of a substantial number of degrees of the crank shaft movement, said period commencing at the beginning of the total exhaust period, recompressing the burned gases remaining in the combustion chamber after the first period of exhaust, and exhausting the recompressed burned gases within approximately the last fifteen degrees of the crank shaft movement at the terminus of the total exhaust period.

6. The method of operation of combustion engines, having combustion chambers, primary and secondary intake valves, a carburetor, connected to the primary intake valve, a supercharger connected to the secondary intake valve, and primary and secondary exhaust valves, which consists in opening the primary intake valve for a portion of the intake period, closing the primary intake valve and opening the secondary intake valve for the remainder of the intake period, closing the secondary intake valve at the end of the intake period; compressing, igniting and expanding the fuel charge; opening the primary exhaust valve at the end of the expansion period and exuding burnt gases during for a period within the total exhaust period, closing the primary exhaust valve, recompressing the burned gases remaining within the combustion chamber after the closing of the primary exhaust valve, and opening the secondary exhaust valve for the expulsion of the recompressed burned gases.

7. The method of operation of an internal combustion engine, having primary and secondary intake valves operating on the four stroke cycle, a carburetor connected to the primary intake valve, a supercharger connected to the secondary intake valve, and primary and secondary exhaust valves, which consists in opening the primary intake valve for a portion of the intake period, closing the primary intake valve and opening the secondary intake valve for the remainder of the intake period, closing the secondary intake valve at the end of the intake period, compressing and igniting the fuel charge, opening the primary exhaust valve for a period of a substantial number of degrees at the beginning of the total exhaust period, closing the primary exhaust valve, recompressing the remaining burned gases after the closing of the primary exhaust valve, and opening the secondary exhaust valve for the expulsion of the burned gases.

8. In a four cycle internal combustion engine having exhaust valve means associated with a combustion chamber, the combination of means for opening the exhaust valve means at the beginning of the exhaust period, means for closing the exhaust valve means after a portion of the exhaust period has elapsed, means for recompressing the burned gases within the combustion chamber, means for opening the exhaust valve means near the end of the exhaust period for the expulsion of the recompressed burned gases, and means for closing the exhaust valve means at the end of the exhaust period.

9. In a combustion engine having exhaust valve means associated with a combustion chamber, the combination of means for keeping open the exhaust valve means for a substantial number of degrees of the commencement of the exhaust period, means for closing the exhaust valve means at the end of said portion, means for recompressing the burned gases remaining within the combustion chamber, means for opening the exhaust valve means near the end of the exhaust period for the expulsion of the recompressed burned gases, and means for closing the exhaust valve at the end of the exhaust period.

10. In a four-cycle internal combustion engine having exhaust valve means associated with a combustion chamber, the combination of means for opening the exhaust valve means for a substantial number of degrees of the commencement of the exhaust period, means for closing the exhaust valve means at the end of said number of degrees, means for recompressing the burned gases remaining within the combustion chamber, means for opening the exhaust valve means for a substantial number of degrees approaching the terminal of the exhaust period and means for closing the exhaust valve means at the end of the exhaust period.

11. In a four-cycle internal combustion engine, the combination of a combustion chamber, an intake valve means and a plurality of exhaust valves associated with the combustion chamber, means for opening the intake valve means at the beginning of the intake period, means for closing the intake valve means at the end of the intake period, means for compressing the fuel, means for igniting the fuel, means for opening one of the exhaust valves at the beginning of the exhaust period, means for closing the exhaust valves after a portion of the exhaust period has elapsed for recompression of the burned gases remaining in the combustion chamber, means for opening another of the exhaust valves near the end of the exhaust period for the expulsion of the recompressed burned gases and means for closing the last mentioned valve at the end of the exhaust period.

12. In a four-cycle internal combustion engine, the combination of a combustion chamber, an intake valve means and a plurality of exhaust valves associated with the combustion chamber, means for opening the intake valve means at the beginning of the intake period, means for closing the intake valve means at the end of the intake period, means for compressing the fuel, means for igniting the fuel, means for opening one of the exhaust valves at the beginning of the exhaust period, and maintaining the same in open condition for a period of a substantial number of degrees from the beginning of the exhaust period, means for closing this valve at the end of this period for recompression of the burned gases remaining within the combustion chamber, means for opening another of the exhaust valves near the end of the exhaust period for the expulsion of the recompressed burned gases and means for closing the last mentioned valve at the end of the exhaust period.

13. In a four-cycle internal combustion engine, the combination of a combustion chamber, an intake valve means and a plurality of exhaust valves associated with the combustion chamber, means for opening the intake valve means at the beginning of the intake period, means for closing the intake valve means at the end of the intake period, means for compressing the fuel, means for igniting the fuel, means for opening one of the exhaust valves at the beginning of the exhaust period, and maintaining the same in open condition for a period of a substantial number of degrees from the beginning of the exhaust period, means for closing this valve at the end of this period for recompression of the burned gases remaining within the combustion chamber, means for opening another of the exhaust valves a substantial number of degrees before the end of the exhaust period and maintaining the same in open condition to the end of the exhaust period for the expulsion of the recompressed exhaust gases, and means for closing the last mentioned valve at the end of the exhaust period.

14. The method of operating combustion engines, including the step of initially intaking air and fuel at substantially atmospheric pressure and continuing the same throughout the greater part of the normal intake period, and terminating the same near the end of said period; substantially coincident with said termination the further step of intaking a desired content at greater than atmospheric pressure; then the further step of further compressing said intaken products; then the further step of igniting said compressed products; then the further step of expanding said combusting products; then the further step of initially exhausting a part of said products; then the further step of recompressing the unexhausted portion of said products; then the further step of exhausting said recompressed products; and then repeating the foregoing steps in the order named.

15. The method of operating combustion engines, including the step of initially intaking at high velocity and substantially atmospheric pressure; then the further step, commencing substantially simultaneously with the stoppage of said initial intake, of further intaking at greater than atmospheric pressure; then the further step of compressing said intaken products; then the further step of igniting said compressed products; then the further step of expanding said combusting products; then the further step of initially exhausting a part of said products; then the further step of recompressing the unexhausted portion of said products; then the further step of exhausting the said compressed products; and then repeating the foregoing steps in the order named.

16. The method of operating combustion engines, including the step of initially intaking at high velocity and substantially atmospheric pressure; then the further step, commencing substantially simultaneously with the stoppage of said initial intake, of further intaking at greater than atmospheric pressure in the same path and direction as said atmospheric pressure intake and of continuing said further intake throughout a substantial part of the early portion of the normal compression period; then the further step of compressing said intaken products; then the further step of igniting said compressed products; then the further step of expanding said combusting products; then the further step of initially exhausting a part of said products; then the further step of recompressing the unexhausted portion of said products; then the further step of exhausting said compressed products; and then repeating the foregoing steps in the order named.

17. The method of operating combustion engines, including the step of initially intaking at high velocity and substantially atmospheric pressure; then the further step, commencing substantially simultaneously with the stoppage of said initial intake, of further intaking at greater than atmospheric pressure; then the further step of compressing said intaken products; then the further step of igniting said compressed products; then the further step of expanding said combusting products; then the further step of initially exhausting a part of said products commencing near the end of the normal expansion or power period and continuing into and throughout the initial portion of the normal exhaust period; then the further step of recompressing the unexhausted portion of said products; then the further step of exhausting said compressed products; and then repeating the foregoing steps in the order named.

18. The method of operating combustion engines, including the step of initially intaking at high velocity and substantially atmospheric pressure; then the further step, commencing substantially simultaneously with the stoppage of said initial intake, of further intaking at greater than atmospheric pressure; then the further step of further compressing said intaken products, commencing substantially simultaneously with the stoppage of said further intake and continuing throughout the remaining portion of the normal compression period; then the further step of igniting said compressed products; then the further step of expanding said combusting products; then the further step of initially exhausting a part of said products;—then the further step of recompressing the unexhausted portion of said products; then the further step of exhausting said compressed products; and then repeating the foregoing steps in the order named.

19. The method of operating combustion engines, including the step of initially intaking at high velocity and substantially atmospheric pressure; then the further step, commencing substantially simultaneously with the stoppage of said initial intake, of further intaking at greater than atmospheric pressure, and of continuing said further intake throughout a substantial part of the early portion of the normal compression period; then the further step of further compressing said intaken products, commencing substantially simultaneously with the stoppage of said further intake and continuing throughout the remaining portion of the normal compression period; then the further step of igniting said compressed products; then the further step of expanding said combusting products; then the further step of initially exhausting a part of said products, commencing near the end of the normal expansion or power period and continuing into and throughout the initial portion of the normal exhaust period; then the further step of recompressing the unexhausted of said products; then the further step of exhausting said compressed products; and then repeating the foregoing steps in the order named.

20. The method of operating combustion motors having connecting rods, consisting of the step of creating a tension stress upon the connecting rod in the initial part of the intake period, and then during the remainder of said period gradually merging said stress into a compression strain upon said rod; then the further step of gradually increasing said strain on said rod throughout the compression period; then the further step of bringing to its maximum said strain on said rod in the power period; then the further step, commencing in the initial portion of the exhaust period, of gradually relieving said strain on said rod, and then, throughout a substantial part of the last stated period, maintaining and increasing said relieved strain upon said rod, and then in the remainder of the last stated period wholly relieving said strain on said rod; and then repeating the foregoing steps in the sequence named.

21. The method of operation of combustion motors, which includes as a step, initially exhausting a part of the combustion products, then compressing the unexhausted portion of said products, and then exhausting said compressed products.

22. The method of operation of a combustion motor having a cylinder and a piston, which includes the steps of intaking at high velocity and from a source substantially at atmospheric pressure; and substantially simultaneously with the termination of said intake, and within the same intake stroke, admitting a super pressure intake immediately following behind said first intake and from substantially the same point and in the same path.

23. The method of operation of a combustion motor having a cylinder and piston, which includes the steps of initially intaking from a source at substantially atmospheric pressure and throughout the major portion of the normal intake stroke of the piston; substantially simultaneously with the termination of said intake and within the same intake stroke initiating the admittance of a super pressure intake immediately following behind said first intake and from substantially the same point and in the same path; and continuing said super intake throughout the residue of the intake stroke and terminating said super intake at a substantial distance into the initial part of the succeeding stroke of the piston.

24. The method of operation of a combustion motor having a cylinder and piston, which includes the steps of initially intaking at high velocity, from a source at substantially atmospheric pressure; forming a partial vacuum adjacent the point of intake by terminating said intake within the intake stroke of the piston; and at once admitting a super pressure intake into said partial vacuum.

25. The method of operation of combustion motors, which includes providing an exhaust period comprising the whole of the inward exhaust stroke of the piston and the terminal portion of the preceding power stroke of the piston, during said exhaust period initially exhausting a part of the combustion products, then in a separate further portion of said exhaust period compressing the unexhausted portion of said products, and then in a separate final portion of said exhaust period exhausting said compressed products.

CARLETON COLE CHAMPION, Jr.